No. 668,106. Patented Feb. 12, 1901.
G. A. LONG.
STEERING MECHANISM FOR SHIPS OR VEHICLES.
(Application filed Oct. 11, 1899. Renewed July 25, 1900.)
(No Model.) 2 Sheets—Sheet 1.
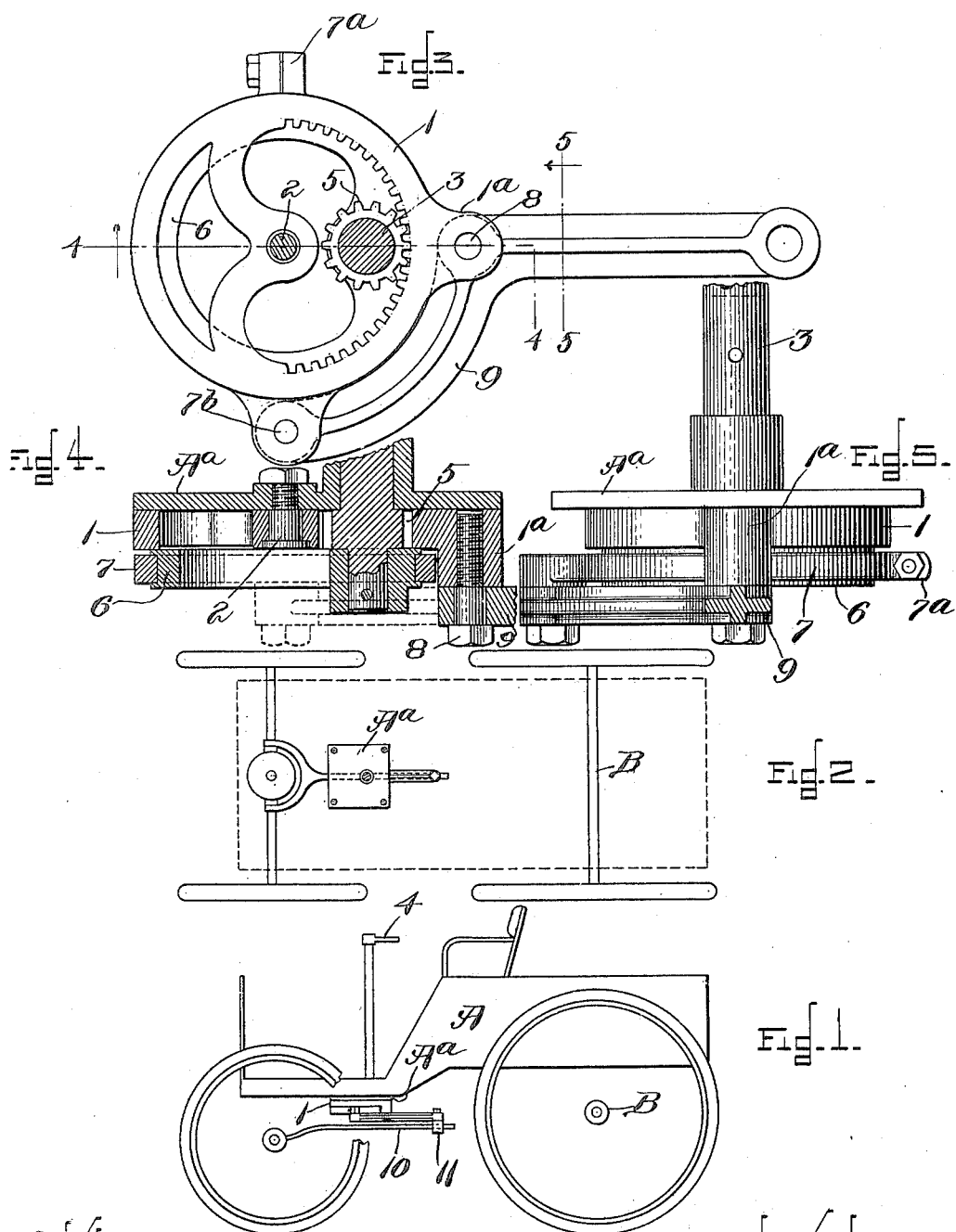

No. 668,106. Patented Feb. 12, 1901.
G. A. LONG.
STEERING MECHANISM FOR SHIPS OR VEHICLES.
(Application filed Oct. 11, 1899. Renewed July 25, 1900.)
(No Model.) 2 Sheets—Sheet 2.
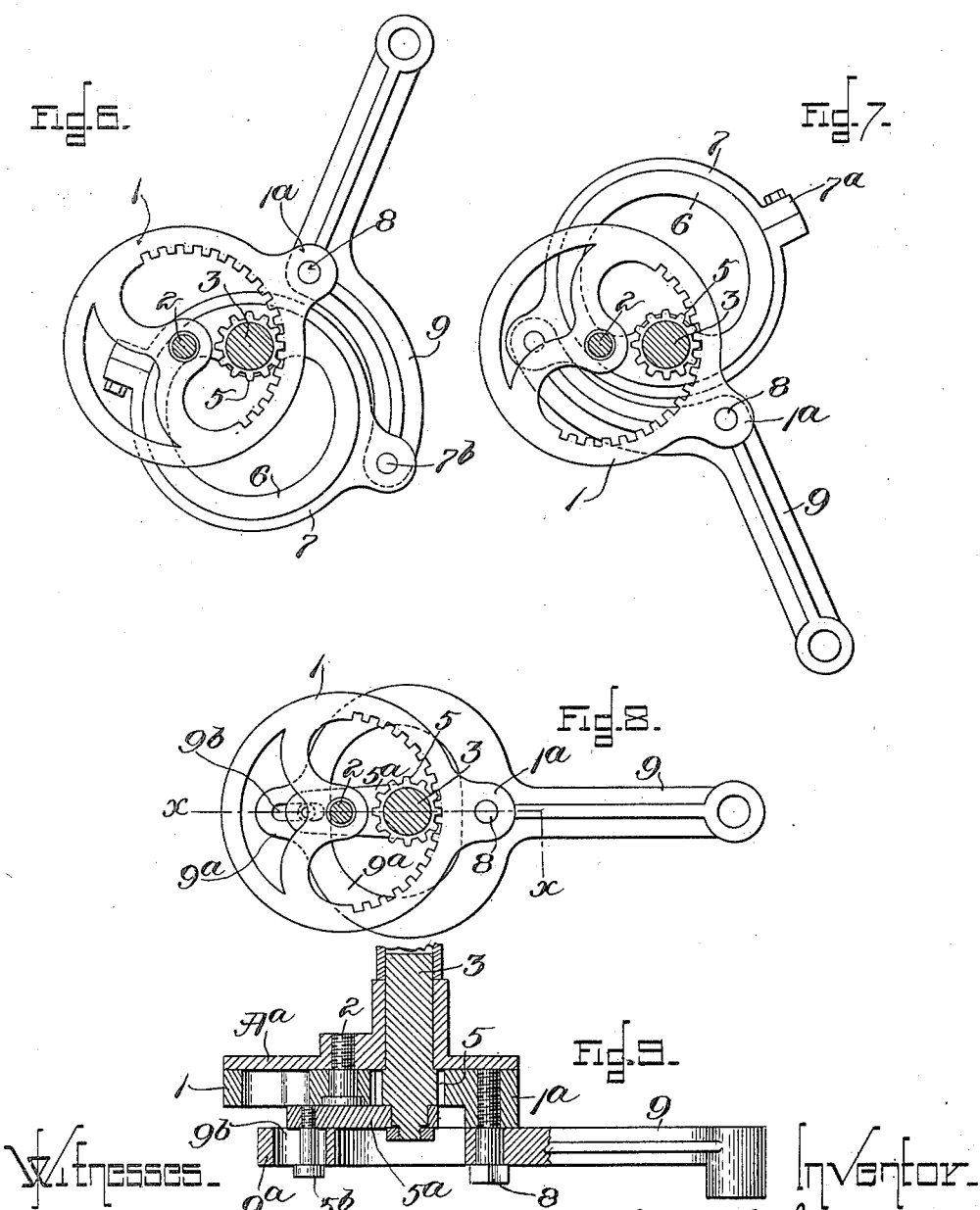

UNITED STATES PATENT OFFICE.

GEORGE A. LONG, OF BOSTON, MASSACHUSETTS.

STEERING MECHANISM FOR SHIPS OR VEHICLES.

SPECIFICATION forming part of Letters Patent No. 668,106, dated February 12, 1901.

Application filed October 11, 1899. Renewed July 25, 1900. Serial No. 24,811. (No model.)

*To all whom it may concern:*

Be it known that I, GEORGE A. LONG, of Boston, Suffolk county, Massachusetts, have invented a new and useful Steering Mechanism for Ships, Vehicles, or the Like, of which the following is a specification, reference being had to the accompanying drawings, in which—

Figure 1 is a sketch elevation of a vehicle, showing my mechanism in place. Fig. 2 is a plan of Fig. 1, the body of the vehicle being removed. Fig. 3 is a plan of the mechanism, the bed-plate being removed. Fig. 4 is a section on line 4 4 of Fig. 3. Fig. 5 is an elevation looking in the direction of the arrow, Fig. 3. Figs. 6 and 7 are the same as Fig. 3, the mechanism being shown in its two opposed positions and upon a smaller scale. Fig. 8 is a similar plan to Fig. 3, showing a modified form. Fig. 9 is a section on line X X of Fig. 8.

My invention is a new mechanical motion, and I have especially contemplated applying it to the purpose of steering motor-vehicles and the like, though it will be obvious that it may be otherwise employed; but in this application I shall describe its application to a motor-vehicle, for this concrete example will render it much more readily understood, both in its application, operation, and mechanism.

In almost all the steering devices with which I am acquainted the ultimate control of the part to be moved by the movement of which the change of direction is effected resides in what is generally called a "tiller," which is a lever attached mediately or immediately to the part to be moved. This statement is generally true of motor-vehicles, though the simple lever-tiller is in the case of motor-vehicles usually somewhat obscured under various contrivances outwardly varying from the familiar tiller. In the perfect and proper control of this tiller consists the excellence of any steering device, and especially is this true of steering devices for motor-vehicles, for in these two conflicting requirements meet and demand recognition, and in the effort to satisfy these requirements the best that has hitherto been accomplished, so far as my knowledge goes, is a compromise, which accomplished neither requirement.

The conflicting requirements of which I speak are these: that the leverage in favor of the operator or steersman shall be sufficient to require only the exertion of a small force to move or hold the mechanism, and from this it results that the extent of motion due to great leverage must be considerable—a great disadvantage when the room for operation is limited and the operator seated. It also results that the response to the action of the operator in the matter of direction must be correspondingly slow, and also that small vibrations caused by the wheels of the carrirge meeting stones and unevennesses in the road communicated to the operator's hand through the tiller and steering-gear are magnified and become very annoying and sometimes by their long continuances positively dangerous and disabling. The opposed requirement is that the operation of steering shall be quick and responsive, necessitating shorter leverage, with the result, if it is adopted, that considerable strength must be exerted to move and hold the steering mechanism, and that it is difficult to make slight changes of direction accurately and difficult to hold closely to any given direction and to meet and control the tendencies to small variations of direction caused by small obstructions and inequalities of the road. It is the object and effect of my device to reconcile these two opposed requirements, to give the steersman the advantage in delicacy of steering and ease of control, usually only associated with a large favorable leverage and at the same time the quick response and small range of movement usually only associated with direct connection, and to prevent transmission to the hand of the steersman of the small jars and vibrations due to roughness in the road.

In the drawings, A represents the body of a vehicle, and B the running-gear. These are shown as of ordinary construction, for this application deals only with the steering mechanism. At a convenient and suitable position upon the body or running-gear I secure the bed-plate $A^a$ of my mechanical movement. I have shown this as secured at the front under side of the body A of the vehicle; but it will be obvious that the exact location and connection with the steering-wheels of the vehicle is a matter of mere mechanics. Pivoted upon the under side of this bed-plate is an internal gear 1, the arms of which are so placed as to permit of the turning of the gear upon its pivot 2 to as great a degree as may be deemed desirable. Journaled in the bed-plate A$^a$ is an upright shaft 3, having a handle 4 or other means of control at its upper end and carrying a pinion 5 to mesh with the teeth of the internal gear. The lower end of the shaft passes through and below the internal gear and carries rigidly affixed the eccentric 6, immediately below the gear. It will now be obvious that movement of the shaft 3 upon its axis will revolve pinion 5, and so cause gear 1 to turn upon its axis 2, and will also revolve eccentric 6 about the shaft 3 as a center. The eccentric 6 has the customary strap 7 by which the motion of the eccentric is made effective, and this strap can by means of nut and shoulders 7$^a$ be tightened to any degree required. A projection 1$^a$ upon the outside edge of the rim of gear 1 carries a pivot 8 for a lever 9, one end of the lever being secured at 7$^b$ to the strap 7 of the eccentric 6 and the other carrying means to connect the lever 9 with the tiller 10 of the ship or vehicle or with the thing to be moved. In the drawings I have shown as a means a sleeve 11, pivoted at the free end of the lever 9, the tiller being free to move longitudinally through the sleeve, as will be necessary when the tiller and its operating-lever do not swing upon coincident centers. It will now be obvious that the operating-lever 9 moves upon two centers—first, it swings upon the pivot 8 upon the rim of gear 1, and, secondly, it moves bodily with the gear 1 as it revolves, and thus in a sense swings upon the pivot 2.

The mode of operation is as follows: When the operator desires to turn the carriage, he turns the handle 4, which controls shaft 3, and this in turn, through pinion 5, moves the internal gear 1 and carries in the desired direction the lever 9, which is pivoted upon the projection 1$^a$ and pivot 8 upon the rim of gear 1. At the same time and by the same movement the eccentric 6 is thrown, and that end of the lever 9 which is connected with strap 7 is moved, throwing the other end of lever 9 a corresponding distance in the opposite direction, the pivot 8 being the fulcrum. Thus the lever 9 is subject to two motions at the same time—one the bodily movement caused by the movement of gear 1, which carries the pivot 8 of lever 9, and the other the movement upon and around pivot 8, caused by the swinging of the eccentric 6. The free end of lever 9 therefore is thrown to one side or the other, as may be required, the sum total of the swing of the lever being cumulative and compounded of the motion due to the motion of the lever bodily along with its pivot 8, fast to the rim of gear 1, and the motion of lever 9 upon or around its pivot 8 due to the movement of the end of the lever actuated by the eccentric 6 in strap 7. The tiller 10 or other thing to be moved, which is controlled by the free end of the lever 9, is correspondingly moved.

The compounding of the motion, as above described, gives to the operator the benefit of a leverage in his favor, while at the same time he has great rapidity. Furthermore, the compound leverage gives to the mechanism the practical effect that it will hold its position, as placed, against force applied to the wheels—that is, against force applied to the short end of the lever—so that the steering-handle does not require to be handled or controlled except when a change of direction is desired, and the disagreeable jar of the handle is avoided.

It will be obvious that for the internal gear a rack might be substituted and that a crank would be a mechanical equivalent for the eccentric. I show in Figs. 8 and 9 an equivalent mechanism, though much inferior in operation to my preferred construction, which I have illustrated in the other figures. In Figs. 8 and 9 a pin-and-slot movement is substituted for the eccentric. Lever 9 is extended back of pivot 8 by a part 9$^a$, having a slot 9$^b$, within which works a pin 5$^b$, fast to an arm 5$^a$, secured to shaft 5. Obviously the turning of shaft 5 will cause part 9$^a$ to move around pivot 8 and lever 9 to turn correspondingly.

The proportions of the parts, handles, gears, pinions, eccentrics, arms, &c., may be varied to suit the conditions and necessary requirements, as will be clear, and such variation is within the knowledge of mechanics.

What I claim is—

1. The mechanical motion above described made up of an actuating-shaft; a motion-reducing device controlled by that shaft; an operating-lever actuated by that motion-reducing device; a second motion-reducing device controlled by the actuating-shaft and actuating the operating-lever; that operating-lever; all organized and operating to form a compound cumulative actuating device.

2. The mechanical motion above described, made up of an actuating-shaft; a cog-wheel mounted upon that shaft; a rack engaging with that cog-wheel and actuating an operating-lever; an eccentric controlled by that shaft and actuating the operating-lever; that operating-lever; all organized and operating substantially as described.

3. The mechanical motion above described, made up of a bed-plate; an actuating-shaft mounted in the bed-plate; a pinion mounted upon that shaft; an internal gear mounted upon the bed-plate and engaging the pinion, and controlling the bodily motion of an operating-lever; an eccentric mounted upon that shaft and controlling the axial motion of the operating-lever upon its pivot; the operating-lever; all organized and operating substantially as described.

4. The steering mechanism for a motor-vehicle above described made up of an actuating-shaft; a cog-wheel mounted upon that shaft; a rack engaging with that cog-wheel and actuating the operating-lever; an eccentric controlled by that shaft and actuating the operating-lever; the operating-lever and means to connect the operating-lever to the wheels of the vehicle.

GEORGE A. LONG.

Witnesses:
O. R. MITCHELL,
JOSEPH T. BRENNAN.